United States Patent
Price et al.

(10) Patent No.: US 8,417,566 B2
(45) Date of Patent: *Apr. 9, 2013

(54) AUDIOVISUAL SYSTEM AND METHOD FOR DISPLAYING SEGMENTED ADVERTISEMENTS TAILORED TO THE CHARACTERISTIC VIEWING PREFERENCES OF A USER

(75) Inventors: William P. Price, Santa Ana, CA (US); R. Gregory Kalsow, Lake Forest, CA (US); Leopold B. Willner, Santa Cruz, CA (US)

(73) Assignee: Keen Personal Media, Inc., Irvine, CA (US)

( * ) Notice: Subject to any disclaimer, the term of this patent is extended or adjusted under 35 U.S.C. 154(b) by 246 days.

This patent is subject to a terminal disclaimer.

(21) Appl. No.: 12/888,284

(22) Filed: Sep. 22, 2010

(65) Prior Publication Data

US 2011/0010231 A1    Jan. 13, 2011

Related U.S. Application Data

(63) Continuation of application No. 10/022,558, filed on Dec. 14, 2001, now Pat. No. 7,813,954.

(51) Int. Cl.
*G06Q 30/00* (2012.01)
(52) U.S. Cl.
USPC ........................................................ 705/14.1
(58) Field of Classification Search .................. 705/14.1
See application file for complete search history.

(56) References Cited

U.S. PATENT DOCUMENTS

| 5,774,170 | A | 6/1998 | Hite et al. |
|---|---|---|---|
| 6,002,393 | A | 12/1999 | Hite et al. |
| 6,756,997 | B1 | 6/2004 | Ward, III et al. |
| 7,813,954 | B1 * | 10/2010 | Price et al. ................... 705/14.1 |
| 2002/0152117 | A1 | 10/2002 | Cristofalo et al. |
| 2006/0212904 | A1 | 9/2006 | Klarfeld et al. |

OTHER PUBLICATIONS

Office Action dated Oct. 4, 2006 from U.S. Appl. No. 10/022,558, 18 pages.
Office Action dated Apr. 3, 2007 from U.S. Appl. No. 10/022,558, 19 pages.
Office Action dated Oct. 3, 2007 from U.S. Appl. No. 10/022,558, 17 pages.

(Continued)

*Primary Examiner* — Daniel Lastra

(57) ABSTRACT

An audiovisual system for displaying an audiovisual advertisement to a user includes a storage subsystem adapted to receive and store audiovisual advertising segments and to retrieve and transmit stored advertising segments. The audiovisual system further includes a preference determination module coupled to the storage subsystem. The preference determination module is responsive to user input and to metadata to generate one or more user profiles. Each user profile is indicative of characteristic viewing preferences of a corresponding user and includes a time span preference parameter indicative of a preferred advertisement time span of the corresponding user. The audiovisual system further includes a system controller coupled to the storage subsystem. The system controller is responsive to the metadata and to the user profile corresponding to the user to select and retrieve a plurality of stored advertising segments from the storage subsystem and to dynamically assemble the retrieved plurality of stored advertising segments to form the advertisement which conforms to the time span preference parameter of the user profile.

49 Claims, 11 Drawing Sheets

OTHER PUBLICATIONS

Office Action dated Mar. 18, 2008 from U.S. Appl. No. 10/022,558, 18 pages.
Office Action dated Oct. 22, 2008 from U.S. Appl. No. 10/022,558, 18 pages.
Office Action dated Apr. 6, 2009 from U.S. Appl. No. 10/022,558, 18 pages.
Notice of Allowance dated Jun. 9, 2010 from U.S. Appl. No. 10/022,558, 7 pages.

* cited by examiner

AUDIOVISUAL SYSTEM AND METHOD FOR DISPLAYING SEGMENTED ADVERTISEMENTS TAILORED TO THE CHARACTERISTIC VIEWING PREFERENCES OF A USER

RELATED APPLICATIONS

This application is a continuation of U.S. patent application Ser. No. 10/022,558, filed Dec. 14, 2001, which is incorporated in its entirety by reference herein.

BACKGROUND

1. Field of the Invention

The present invention is directed to audiovisual systems and methods for storing and playing back audiovisual data, and more specifically, to audiovisual systems and methods which provide audiovisual data tailored to the characteristic viewing preferences of a user.

2. Description of the Related Art

Audiovisual systems, such as personal video recorders, provide users with the capability of storing audiovisual data in digital form on random-access, read/write, non-volatile storage media for later playback. In addition, such audiovisual systems enable users to choose between viewing audiovisual content in "real-time" as it is streamed from the audiovisual data service provider, or storing the streaming audiovisual content and viewing it some time after it has been streamed to the audiovisual system.

By using audiovisual systems which can store the streaming audiovisual content concurrently with viewing stored audiovisual content, a streaming audiovisual segment can be viewed mere seconds after it has been stored, while continuing to store the remaining portion of the streaming audiovisual segment. In addition, the stored audiovisual segment can be viewed on a different date and time from the original streaming of the audiovisual segment.

Such audiovisual systems allow users to influence the quantity and quality of advertisements contained in the audiovisual content as it is viewed. First, by introducing a time delay between the original streaming of an advertisement and its eventual viewing by the user, the time and date of the viewing of the advertisement is controlled by the user, not by the audiovisual data service provider. Second, by using various "trick-play" functions of the audiovisual system, such as fast-forward or skip, the user can avoid viewing advertisements in the form in which they were originally streamed, or can even avoid viewing the advertisements entirely. By empowering the users in this way, such audiovisual systems may reduce the number of actual viewer advertising impressions that occur and may reduce the effectiveness of these impressions. Therefore, the quantity and quality of these viewer advertising impressions are less certain, thereby affecting the efficacy of advertising fee systems in which the fees paid by advertisers are based on these expectations.

SUMMARY

One aspect of the present invention relates to an audiovisual system for use with a display device for displaying an audiovisual advertisement to a user. The audiovisual system comprises a storage subsystem adapted to receive and store audiovisual advertising segments and to retrieve and transmit stored audiovisual advertising segments. Each audiovisual advertising segment has metadata indicative of the audiovisual advertising segment. The audiovisual system further comprises a preference determination module coupled to the storage subsystem. The preference determination module is responsive to user input and to the metadata to generate one or more user profiles. Each user profile is indicative of characteristic viewing preferences of a corresponding user. The audiovisual system further comprises a system controller coupled to the storage subsystem. The system controller is responsive to the metadata and to the user profile corresponding to the user to select and retrieve a plurality of stored audiovisual advertising segments from the storage subsystem and to dynamically assemble the retrieved plurality of stored audiovisual advertising segments to form the audiovisual advertisement. The plurality of stored audiovisual advertising segments is selected to tailor the audiovisual advertisement to the characteristic viewing preferences of the user.

Another aspect of the present invention relates to a method of displaying an audiovisual advertisement to a user having characteristic viewing preferences when the user is viewing a display device coupled to an audiovisual system comprising a storage subsystem. The method comprises storing audiovisual advertising segments on the storage subsystem. Each audiovisual advertising segment has metadata indicative of the audiovisual advertising segment. The method further comprises selecting and retrieving a plurality of stored audiovisual advertising segments from the storage subsystem in response to the metadata and to the characteristic viewing preferences of the user. The method further comprises dynamically assembling the retrieved plurality of stored audiovisual advertising segments to form the audiovisual advertisement. The audiovisual advertisement is formed in response to the metadata and to the characteristic viewing preferences of the user. The plurality of stored audiovisual advertising segments is selected to tailor the audiovisual advertisement to the characteristic viewing preferences of the user. The method further comprises displaying the audiovisual advertisement on the display device.

Yet another aspect of the present invention relates to an audiovisual system for use with a display device for displaying an audiovisual advertisement to a user. The audiovisual system comprises a local storage subsystem adapted to receive and store audiovisual advertising segments and to retrieve and transmit stored audiovisual advertising segments. Each audiovisual advertising segment has metadata indicative of the audiovisual advertising segment. The audiovisual system further comprises a local preference determination module coupled to the local storage subsystem. The preference determination module is responsive to user input and to the metadata to generate one or more user profiles. Each user profile is indicative of characteristic viewing preferences of a corresponding user and is stored on the local storage subsystem. Each user profile comprises a time span preference parameter indicative of a preferred advertisement time span of the corresponding user. The audiovisual system further comprises a system controller coupled to the local storage subsystem, The system controller is responsive to the metadata and to the user profile corresponding to the user to select and retrieve at least one stored audiovisual advertising segment from the local storage subsystem. The retrieved stored audiovisual advertising segment is selected to have a time span which conforms to the time span preference parameter of the user.

DETAILED DESCRIPTION

Figure 1:
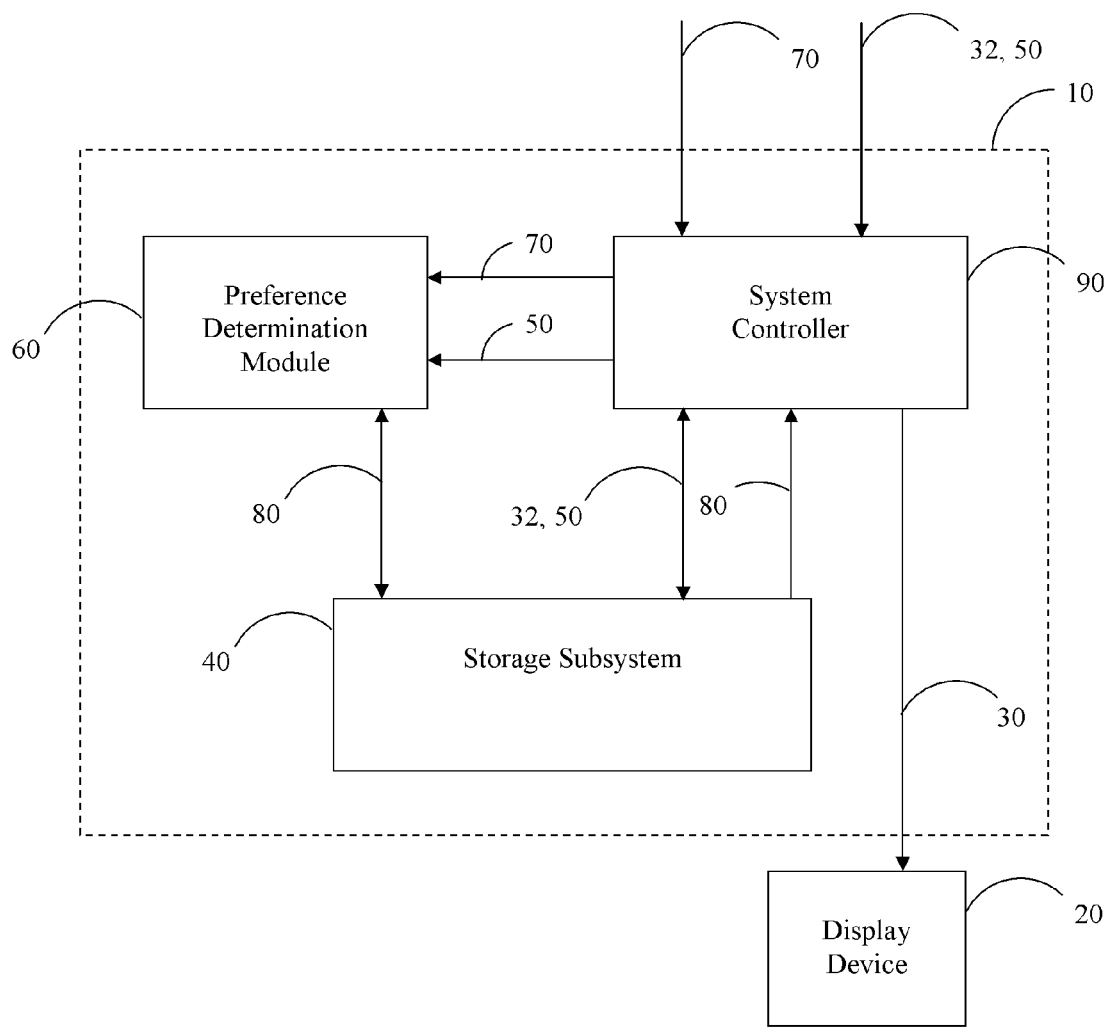
FIG. 1 schematically illustrates an audiovisual system in accordance with an embodiment of the present invention.

FIG. 1 schematically illustrates an audiovisual system 10 in accordance with an embodiment of the present invention. The audiovisual system 10 is used with a display device 20 for displaying an audiovisual advertisement 30 to a user. The audiovisual system 10 comprises a storage subsystem 40 adapted to receive and store audiovisual advertising segments 32 and to retrieve and transmit stored audiovisual advertising segments 32. Each audiovisual advertising segment 32 has metadata 50 indicative of the audiovisual advertising segment 32. The audiovisual system 10 further comprises a preference determination module 60 coupled to the storage subsystem 40. The preference determination module 60 is responsive to user input 70 and to the metadata 50 to generate one or more user profiles 80. Each user profile 80 is indicative of characteristic viewing preferences of a corresponding user. The audiovisual system 10 further comprises a system controller 90 coupled to the storage subsystem 40. The system controller 90 is responsive to the metadata 50 and to the user profile 80 corresponding to the user to select and retrieve a plurality of stored audiovisual advertising segments 32 from the storage subsystem 40 and to dynamically assemble the retrieved plurality of stored audiovisual advertising segments 32 to form the audiovisual advertisement 30. The plurality of stored audiovisual advertising segments 32 is selected to tailor the audiovisual advertisement 30 to the characteristic viewing preferences of the user.

Various audiovisual systems 10 are compatible with embodiments of the present invention. Examples of such audiovisual systems 10 have previously been described in pending U.S. patent application Ser. No. 09/560,722, entitled "Video Recording System Utilizing External Video Storage To Record Streaming Video Data Via An Isochronous Interface," pending U.S. patent application Ser. No. 09/585,249, entitled "Digital Video Recorder Connectable To An Auxiliary Interface Of A Set-Top Box That Provides Video Data Stream To A Display Device Based On Selection Between Recorded Video Signal Received From The Digital Video Recorder And A Real-Time Video Signal," pending U.S. patent application Ser. No. 09/628,583, entitled "Video Recording System Utilizing Host-Processor-Resident Error Recovery To Transfer Non-Time-Critical, Error-Intolerant Data Segments While Transferring Time-Critical, Error-Tolerant Streaming Data Segments At A Required Data Transfer Rate," pending U.S. patent application Ser. No. 09/652,995, entitled "Video Recording System Utilizing Storage Redundancy To Transfer Non-Time-Critical, Error-Intolerant Data Segments While Transferring Time-Critical, Error-Tolerant Streaming Data Segments At A Required Data Transfer Rate," and pending U.S. patent application Ser. No. 09/652,730, entitled "Electronic Program Guide Subsystem For Receiving And Processing Electronic Program Guide Information From A Set-Top Box." Various embodiments of the audiovisual system 10 comprise a personal video recorder. Persons skilled in the art recognize that other embodiments of audiovisual systems 10 are compatible with the present invention.

In certain embodiments, the audiovisual system 10 receives audiovisual data, including audiovisual programs, audiovisual advertising segments 32, and metadata 50, from an audiovisual data service provider that supplies programming to multiple users. Examples of such audiovisual data service providers include, but are not limited to, cable television systems and satellite systems. Alternatively, the audiovisual advertising segments 32 and the metadata 50 can be received from UHF or VHF broadcast signals using an antenna. The audiovisual programs received from the audiovisual data service provider can include, but are not limited to, movies, entertainment programs, information programs, sporting events, or any other broadcasts. In certain embodiments, the audiovisual programs are interspersed with audiovisual advertisements 30. The term "audiovisual" as used herein to describe the data and other features relevant to the present invention, is defined to encompass both audio data and video data which can comprise the broadcast and recorded programs.

The storage subsystem 40 is adapted to receive and store audiovisual advertising segments 32 and to retrieve and transmit stored audiovisual advertising segments 32. In certain embodiments, the storage subsystem 40 is further adapted to receive, store, retrieve, and transmit metadata 50, various system information, and other audiovisual data, such as audiovisual programs. In the embodiment schematically illustrated in FIG. 1, the storage subsystem 40 stores audiovisual advertising segments 32 and metadata 50 received from the audiovisual data source provider and retrieves and transmits the stored audiovisual advertising segments 32 and metadata 50 to the system controller 90.

In certain embodiments of the present invention, the storage subsystem 40 is compatible with a version of the ATA (AT-attachment) standard, such as IDE (Integrated Drive Electronics). In other embodiments, the storage subsystem 40 is compatible with the SCSI (Small Computer System Interface) standard. In still other embodiments, the storage subsystem 40 is compatible with the IEEE 1394 standard, which is described in the "IEEE Std 1394-1995 IEEE Standard for a High Performance Serial Bus," Aug. 30, 1996, which is incorporated by reference herein. Alternatively, the storage subsystem 40 can be a writable digital video disk (DVD) drive, or another technology that comprises read/write, random-access, non-volatile storage media.

Figure 2:
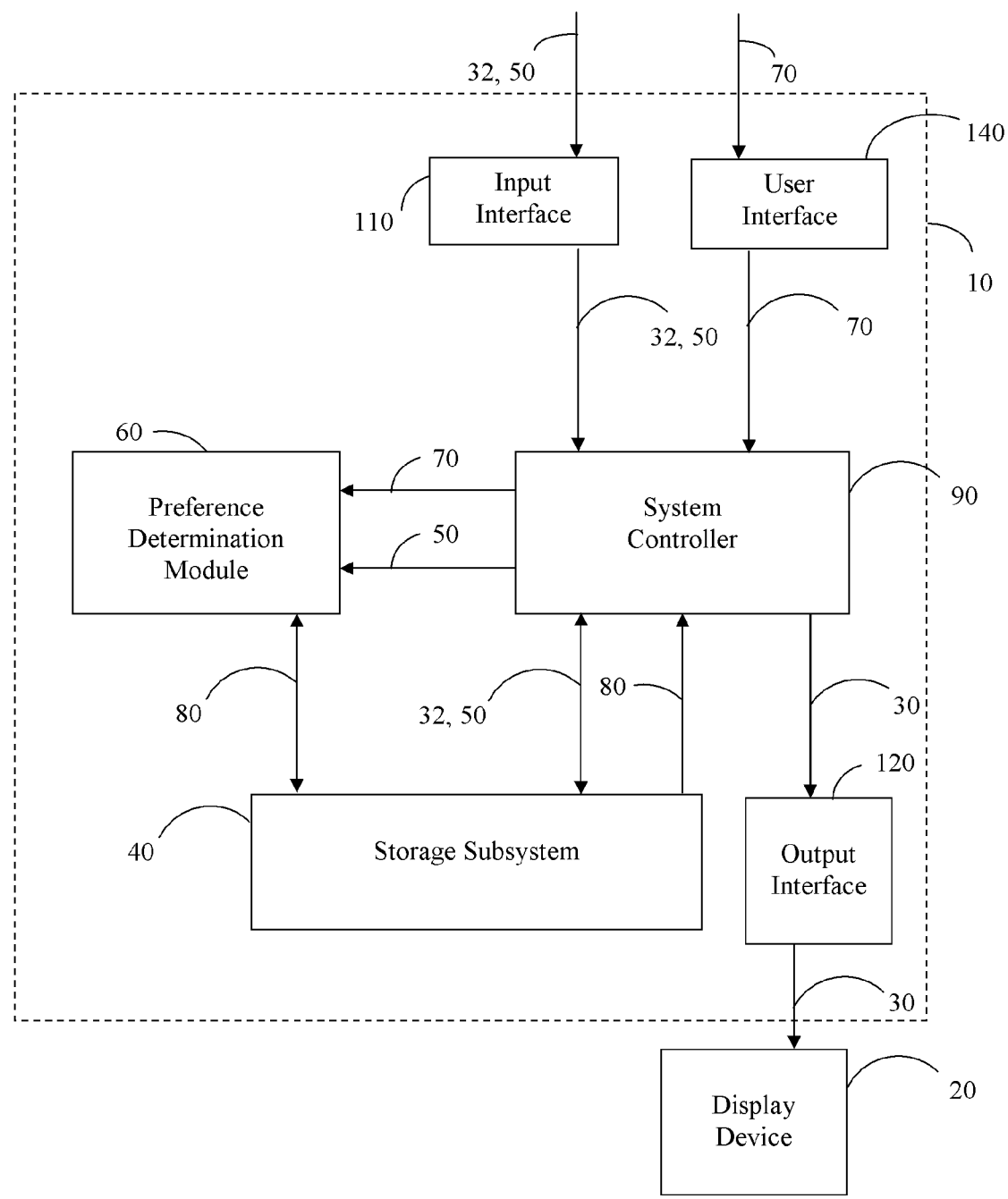
FIG. 2 schematically illustrates an audiovisual system in accordance with another embodiment of the present invention comprising an input interface, an output interface, and a user interface.

Audiovisual data compatible with the present invention, including audiovisual programs and audiovisual advertising segments 32, can be analog-formatted or digital-formatted, and can be encoded and/or encrypted. In certain embodiments, as schematically illustrated in FIG. 2, the audiovisual data is received by an input interface 110 of the audiovisual system 10. Similarly, in certain embodiments, the audiovisual data to be viewed by the user, including the audiovisual advertisement 30 formed from the retrieved plurality of stored audiovisual advertising segments 32, are transmitted to an output interface 120 coupled to the display device 20. In certain embodiments, the display device 20 comprises a television. The input interface 110 is configured to respond to the received audiovisual data by generating data with a format which is compatible with the other components of the audiovisual system 10. Similarly, the output interface 120 is configured to respond to the audiovisual data from the system controller 90 and other components of the audiovisual system 10 by generating audiovisual data compatible with the display device 20.

To provide compatibility of the audiovisual system 10 with analog-formatted audiovisual data, the input interface 110 of one embodiment comprises an MPEG (Motion Pictures Experts Group) encoder, which generates compressed digitally-formatted data segments in response to the analog-formatted audiovisual data. Similarly, in such embodiments, the output interface 120 comprises an MPEG decoder. Furthermore, for particular embodiments that are compatible with encrypted audiovisual data (e.g., audiovisual data from premium cable channels), the input interface 110 comprises a decrypter. Alternatively, in other embodiments, the encoding and decrypting features described above may instead by performed by the system controller 90, or by some other component of the audiovisual system 10. Persons skilled in the art are able to provide an input interface 110 and an output interface 120 that receive and appropriately respond to audiovisual data in a manner in accordance with the present invention.

Audiovisual programs and audiovisual advertising segments 32 are transmitted to the audiovisual system 10 by the audiovisual data service provider. In certain embodiments, the audiovisual advertising segments 32 are transmitted concurrently with the transmission of audiovisual programs. In other embodiments, the audiovisual advertising segments 32 are transmitted during a separate time period from the transmission of the audiovisual programs. As described more fully below, in certain embodiments, the audiovisual advertising segments 32 are stored by the storage subsystem 40 to create an advertising segment database from which the audiovisual advertisement 30 is generated.

The audiovisual programs and the audiovisual advertising segments 32 have corresponding metadata 50 comprising information indicative of the respective audiovisual program or advertising segment 32. The metadata 50 of certain embodiments is incorporated into the audiovisual programs and audiovisual advertising segments 32, while in other embodiments, the metadata 50 is separate from the audiovisual content it describes. In addition, metadata 50 can be stored by the audiovisual system 10 on the storage subsystem 40 along with the audiovisual content the metadata 50 describes, or can be stored separately.

In certain embodiments, metadata 50 indicative of an audiovisual program can include, but is not limited to, the time and date of broadcast, channel, title, time length, category (e.g., genre) of the program, principal actors, director, and brief synopsis. In addition, the metadata 50 corresponding to the audiovisual program can comprise signals or information which indicate the start of advertising intervals or "commercial breaks" in the audiovisual program and the length of the commercial break. The audiovisual system 10 responds to such metadata 50 by inserting one or more audiovisual advertisements 30 to fill the commercial break with the advertisements 30 when viewed by the user.

Metadata 50 indicative of an audiovisual advertisement segment 32 can include, but is not limited to, time length, subject matter, or one or more presentation directives for the audiovisual advertisement segment 32. As is described more fully below, a presentation directive typically comprises one or more guidelines or criteria for conditions under which the audiovisual advertisement segment 32 is to be presented by the audiovisual system 10 to the user. For example, the presentation directive can comprise one or more guidelines regarding an appropriate sequence order of the dynamically assembled plurality of stored audiovisual advertising segments 32 which comprise an audiovisual advertisement 30.

In certain embodiments, metadata 50 is transmitted to the audiovisual system 10 by the audiovisual data service provider, while in other embodiments, metadata 50 is generated or modified by the audiovisual system 10 itself. In certain embodiments in which metadata 50 is transmitted to the audiovisual system 10, the input interface 110 is configured to receive metadata 50 and to transmit metadata 50 to the system controller 90. The system controller 90 can transmit the metadata 50 to be stored to the storage subsystem 40 in conjunction with the storage of the audiovisual data for later retrieval, as schematically illustrated in FIG. 2. In other embodiments, the input interface 110 is configured to transmit metadata 50 directly to the storage subsystem 40 or other appropriate components of the audiovisual system 10.

In certain embodiments in which the metadata 50 is generated by the audiovisual system 10, the input interface 110 transmits the audiovisual data to the system controller 90 or other appropriate components of the audiovisual system 10, which then generates the corresponding metadata 50. The resultant metadata 50 is transmitted to the storage subsystem 40 to be stored in conjunction with the storage of the audiovisual data for later retrieval.

Figure 3:
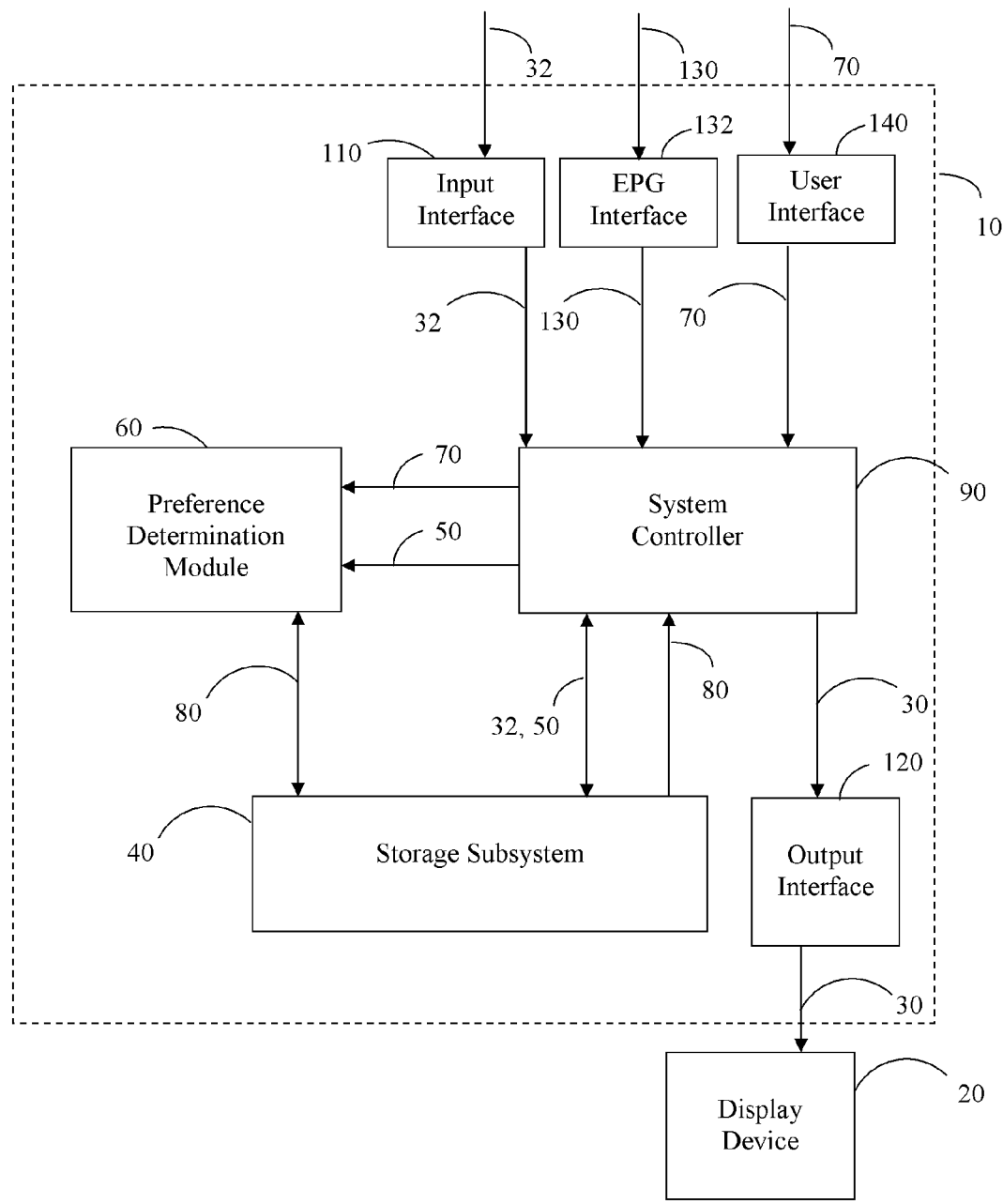
FIG. 3 schematically illustrates an audiovisual system in accordance with another embodiment of the present invention comprising an electronic program guide interface.

In certain such embodiments, metadata 50 indicative of audiovisual program segments can be generated based on electronic program guide (EPG) information 130 received by the system controller 90, as schematically illustrated in FIG. 3. The EPG information 130 of certain embodiments is a database containing information regarding the current and future broadcast schedules for various audiovisual program segments from various broadcast channels. This EPG information 130 can include information indicative of the audiovisual program segment, examples of which include, but are not limited to, the time and date of broadcast, channel, title, category (e.g., genre) of the program, principal actors, director, and brief synopsis. In one embodiment, the EPG information 130 is communicated to the audiovisual system 10 as a signal accompanying the audiovisual data, received by the input interface 110, and transmitted to the appropriate components of the audiovisual system 10. Alternatively, as schematically illustrated in FIG. 3, the EPG information 130 is generated by a separate source from that of the audiovisual data and is received by the audiovisual system 10 via an EPG interface 132. Once the EPG information 130 regarding the audiovisual programs is communicated to the user via the display device 20, the user can select audiovisual programs to be stored by the storage subsystem 40.

In certain other embodiments, metadata 50 indicative of an audiovisual advertising segment 32 can also be generated by the system controller 90 or a separate segment analysis module in response to the audiovisual advertising segment 32 itself. In certain such embodiments, the system controller 90 can include a recognition algorithm which analyzes the video and audio data of the audiovisual advertising segment 32 to determine the existence of various features and to generate appropriate metadata 50. Such recognition technologies for voice recognition, image recognition (including face recognition), text recognition, manual indexing, and scene change recognition (including identifying and marking the starting points of video clips) already exist and are in vogue. Metadata 50 generated in this way can be stored in conjunction with the audiovisual advertising segments 32 or can be generated "on-the-fly" as the advertising segment 32 is retrieved from storage. Examples of recognition technologies compatible with embodiments of the present invention include, but are not limited to, the "Media Gateway Suite" available from Pictron, Inc. of San Jose, Calif., and the "VideoLogger" system available from Virage, Inc. of San Mateo, Calif.

In the embodiment illustrated in FIG. 2, the user controls the audiovisual system 10 by sending appropriate signals to the system controller 90 via a user interface 140. Besides permitting the user to select audiovisual programs for storing by the storage subsystem 40, the user interface 140 allows the user to control other operation parameters of the audiovisual system 10, such as playback commands. As is described more fully below, in certain embodiments, the user interface 140 is also used to communicate other parameters to the system controller 90, such as the identity of the user, which can be used by the audiovisual system 10 to create metadata 50.

Various embodiments of the audiovisual system 10 include user interfaces 140 based on a variety of technologies. For example, the user interface 140 can comprise a remote control keypad device, or a keypad wired directly to the audiovisual system 10. Alternatively, a pointing device, such as a mouse, trackball, joystick, stylus, or laser pointer, may be used in conjunction with a displayed graphical-user interface image on the display device 20 to permit the user to communicate selections and other parameters to the audiovisual system 10. Persons skilled in the art are able to select an appropriate communication technology for the user interface 140 in accordance with the present invention.

Figure 4:
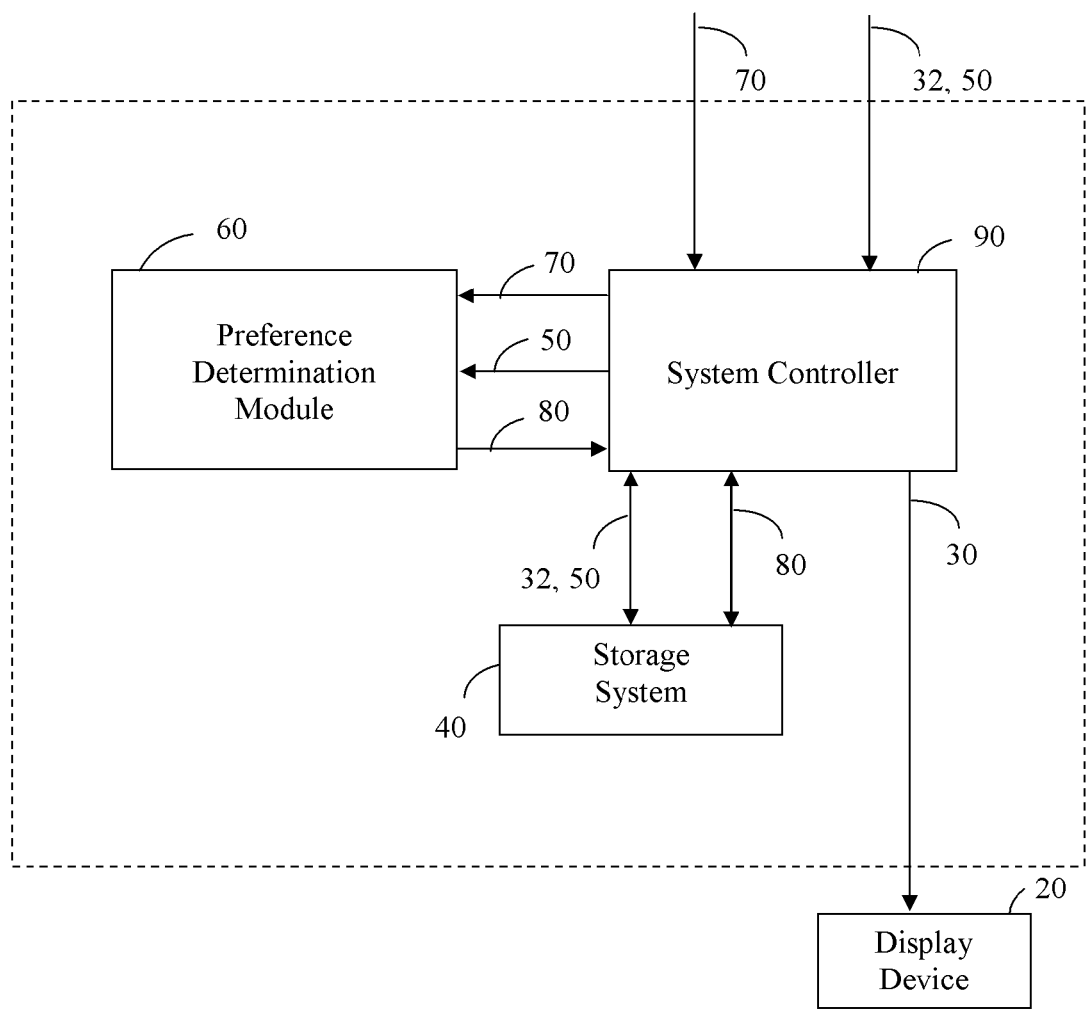
FIG. 4 schematically illustrates an audiovisual system in accordance with another embodiment of the present invention comprising a preference determination module coupled to a storage subsystem via a system controller.

In certain embodiments, as schematically illustrated in FIG. 1, a preference determination module 60 is coupled to the storage subsystem 40. In certain other embodiments, as schematically illustrated in FIG. 4, the preference determination module 60 is coupled to the storage subsystem 40 via the system controller 90. The preference determination module 60 is responsive to the user input 70 and to the metadata 50 to generate one or more user profiles 80. The preference determination module 60 of certain embodiments is an algorithm, enabled in hardware, software, or both, which monitors a user's viewing patterns to create a user profile 80 corresponding to the user's viewing preferences. In other embodiments, the preference determination module 60 can be resident in the system controller 90. An example of a preference determination module 60 compatible with the present invention is MbTV™ sold by Metabyte Networks, Inc. of Fremont, Calif.

In embodiments in which the audiovisual system 10 has multiple users, the preference determination module 60 can maintain a separate user profile 80 for each user. In certain embodiments, each user profile 80 includes information provided by the corresponding user via the user input 70 to identify the user and to distinguish the user from other users of the audiovisual system 10. This information can include, but is not limited to, name, demographic information such as age and sex, and hobbies and interests. In certain embodiments, the user provides this information via the user input 70 in response to prompts generated by the audiovisual system 10.

In addition, the user profile 80 comprises information indicative of the characteristic viewing preferences of the user. By monitoring the user input 70 during use of the audiovisual system 10 by the user, the preference determination module 60 of certain embodiments develops and compiles statistical information regarding the viewing preferences of the user. The user input 70 can include, but is not limited to viewing decisions by the user as expressed by viewing commands such as channel change commands, fast-forward commands, or skip commands. By correlating these viewing commands with metadata 50 regarding the audiovisual programs and audiovisual advertising segments 32, the preference determination module 60 can generate information regarding the user's viewing preferences, including, but not limited to, preferences of subject matter, genre, or performer. This information can then be included in the user profile 80, which in certain embodiments, can be uploaded to the audiovisual advertisement provider.

In certain embodiments, the preference determination module 60 can generate a user profile 80 comprising an interest parameter which is indicative of an estimated time interval during which the user is predicted to continue viewing a particular audiovisual advertisement 30. In such embodiments, the user input 70 comprises a plurality of viewing decisions which the user previously made when other advertisements 30 were displayed. In response to a displayed advertisement 30, these viewing decisions may be to watch the advertisement 30, change the channel, investigate the EPG information 130, or otherwise ignore the advertisement 30. Information available to be tracked by the audiovisual system 10 which can be used to generate the interest parameter includes, but is not limited to, time and date of advertising segment or advertisement presentations, duration of the presentations, time and date of user interruptions, and destination channels. In certain embodiments, this information can be uploaded to the advertisement content provider.

In certain embodiments, the preference determination module 60 generates one interest parameter corresponding to the user's responses to advertisements 30 in general by utilizing a statistical analysis of the previously-made viewing decisions by the user for all advertisements 30. In certain other embodiments, the preference determination module 60 generates different interest parameters corresponding to the user's responses to different types of advertisements 30 by utilizing separate statistical analyses of the previously-made viewing decisions by the user for advertisements 30 of the particular types. Similarly, the preference determination module 60 can generate different interest parameters based on the time of day or other parameters which affect user viewing behavior.

Alternatively, other embodiments can utilize a separate user response monitor which can monitor the responses of the user to the audiovisual advertisement 30 and transmit the corresponding information to the preference determination module 60, the system controller 90, or other appropriate components of the audiovisual system 10. In certain embodiments, the user response monitor is part of the system controller 90.

For example, when the audiovisual system 10 begins to display an advertisement 30, the user may choose to watch the advertisement 30 or to ignore the advertisement 30 (e.g., change the channel). In such an embodiment, the interest parameter corresponding to the user's interest in advertisements 30 in general would be based on a statistical analysis of the time intervals between the beginnings of previously-displayed advertisements 30 and the user's previous decisions whether to change the channel, as expressed by the user input 70. The interest parameter for a user who tends on average to watch advertisements 30 rather than change the channel would correspond to a longer viewing of advertisements 30 than does the interest parameter of a user who tends to change the channel immediately. In certain embodiments, the interest parameter can be expressed as an "attention span" of the user, with users who tend to watch advertisements 30 having longer attention spans than do users who tend to change channels. In certain such embodiments, the interest parameter can correspond to attention spans of 5, 10, or 15 seconds.

The preference determination module 60 of certain embodiments can also be responsive to EPG information 130, current time of day information, or current date information to generate one or more interest parameters corresponding to the user's attention span for various types of advertisements 30 at various times of day or days of the week. The resultant user profile 80 contains information based on which audiovisual programs and advertisements 30 the user views, what types of audiovisual programs and advertisements 30 the user views, when the user views these audiovisual programs and advertisements 30, and for how long the user views these audiovisual programs and advertisements 30 (e.g., before changing to another audiovisual program).

In certain embodiments, the user profile 80 is transmitted by the preference determination module 60 to the storage subsystem 40 for storage and later retrieval by the preference determination module 60, system controller 90, or other appropriate components of the audiovisual system 10. Once the user input 70 indicating that a particular user has begun a viewing session is received by the audiovisual system 10, the preference determination module 60 of certain embodiments can retrieve the existing corresponding user profile 80 and modify the user profile 80 in accordance with the user input 70 and metadata corresponding to the viewing session.

In certain embodiments, the system controller 90 is coupled to the storage subsystem 40 and comprises a chip or circuit configured to control the operation of the audiovisual system 10. In addition, the system controller 90 of certain embodiments selects and retrieves a plurality of stored audiovisual advertising segments 32 from the storage subsystem 40 in response to the user input 70, metadata 50, and user profiles 80. As is explained more fully below, the system controller 90 dynamically assembles the retrieved plurality of stored audiovisual advertising segments 32 to form the audiovisual advertisement 30 displayed to the user. The system controller 90 selects the plurality of stored audiovisual advertising segments 32 to tailor the audiovisual advertisement 30 to the characteristic viewing preferences of the user as expressed by the user profile 80.

Figure 5:
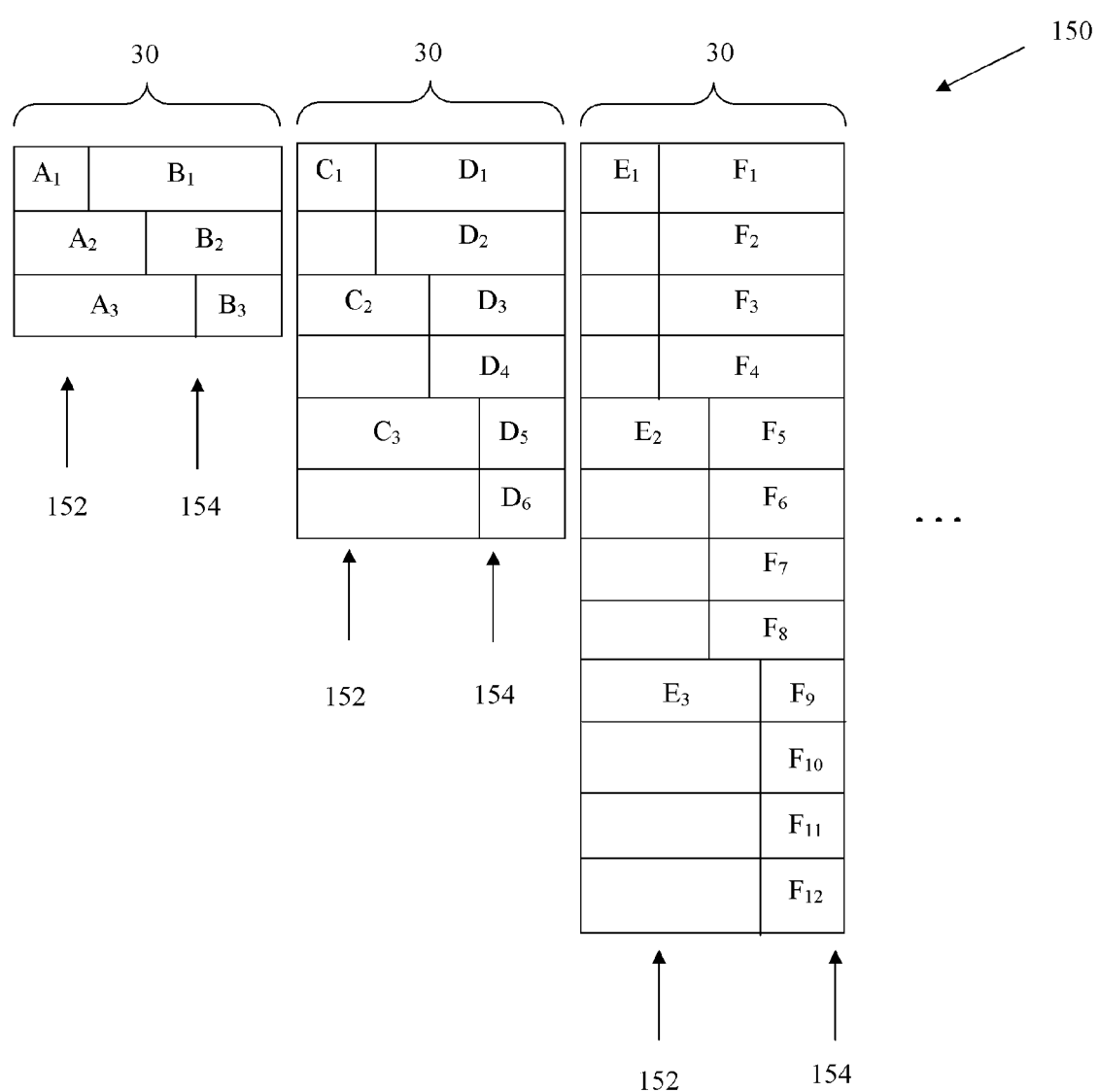
FIG. 5 schematically illustrates an audiovisual advertising segment database for forming two-segment advertisements.

FIG. 5 schematically illustrates an audiovisual advertising segment database 150 for forming two-segment advertisements 30 compatible with certain embodiments of the present invention. The database 150 comprises one or more audiovisual advertisements 30, each of which comprises a plurality of audiovisual advertising segments 32. The advertising segments 32 of a particular advertisement 30 can be assembled together in various permutations by the system controller 90 to form alternate versions of the advertisement 30. The system controller 90 of certain such embodiments is responsive to the user profile 80 of the current user to select the advertising segments 32 so as to tailor the resultant advertisement 30 to the characteristic viewing preferences of the user.

In the embodiment schematically illustrated in FIG. 5, the system controller 90 selects appropriate advertisement segments 32 to form a resultant advertisement 30 tailored to an interest parameter of the user profile 80. As described above, in certain embodiments, the interest parameter is indicative of an estimated time interval (i.e., the user's "attention span") during which the user is predicted to continue viewing the advertisement 30. In such embodiments, each advertisement 30 comprises a first stored audiovisual advertising segment 152 and a second stored audiovisual advertising segment 154. The first advertising segment 152 comprises a primary message to be displayed to the user during the estimated time interval. The second advertising segment 154 comprises a secondary message to be displayed to the user when the user continues viewing after the estimated time interval.

For example, referring to the embodiment schematically illustrated in FIG. 5, the system controller 90 can form an advertisement 30 by assembling a first advertising segment 152 from the set of $A_m$ advertising segments 32 with a corresponding second advertising segment 154 from the set of $B_n$ advertising segments 32. The size of the box denoting a particular advertising segment 32 in FIG. 5 is schematically indicative of the length of the advertising segment 32. In the embodiment schematically illustrated in FIG. 5, segment $A_1$ is 5 seconds long, segment $A_2$ is 10 seconds long, and segment $A_3$ is 15 seconds long. The corresponding $B_1$, $B_2$, and $B_3$ second advertising segments 154 are 25, 20, and 15 seconds long, respectively. Other lengths of advertising segments 32 are compatible with embodiments of the present invention.

In this way, assembling one of the $A_m$ first advertising segments 152 with a corresponding $B_n$ second advertising segment 154 forms a 30-second advertisement 30. In such an embodiment, in response to a user profile 80 in which the user's estimated time interval (or attention span) is short, the system controller 90 would form the advertisement 30 by assembling the $A_1$ first advertising segment 152 with the $B_1$ second advertising segment 154. Conversely, in response to a user profile 80 with a long estimated time interval, the system controller 90 can form the advertisement 30 by assembling the $A_3$ first advertising segment 152 with the $B_3$ second advertising segment 154. In other embodiments, there can be alternative first advertising segments 152 which conform to the short attention span of the user.

Similarly, the system controller 90 can form other advertisements 30 by assembling a first advertising segment 152 from the set of $C_m$ advertising segments 32 with a corresponding second advertising segment 154 from the set of $D_n$ advertising segments 32. As schematically illustrated in FIG. 5, each of the $C_m$ first advertising segments 152 has two $D_n$ second advertising segments 154 with which it can be assembled to produce a 30-second advertisement 30. Besides responding to the estimated time interval of the user profile 80 to select the first advertising segment 152 from the set of $C_m$ first advertising segments 152, the system controller 90 of such embodiments can respond to other characteristic viewing preferences of the user to select one of the two corresponding possible $D_n$ second advertising segments 154 to form the resultant advertisement 30.

Another advertisement 30 can be generated by the system controller 90 by selecting one of the three $E_m$ first advertising segments 152 to conform to the estimated time interval of the user profile 80 and one of the four corresponding $F_n$ second advertising segments 154 to produce a 30-second advertisement 30. In still other embodiments, the resultant advertisement 30 can be constrained to have a length other than 30 seconds, or can have an unconstrained length.

In certain embodiments, the system controller 90 selects a short first advertising segment 152 for all users, and in response to the user profile 80, selects an appropriate second advertising segment 154 for the current user of the audiovisual system 10. In this way, the primary message of the first advertising segment 152 is viewed by most or all users, while each assembled advertisement 30 is tailored to the characteristic viewing preferences of the various users by selecting the secondary message of the second advertising segment 154 in response to the various user profiles 80.

While the first advertising segments 152 and second advertising segments 154 can be different for different users, such embodiments of the present invention seek to make an advertising impression on all users, including those who will shortly change the channel. In this way, it can be possible to extract advertising revenue on the basis of the population of users who only view the first advertising segment 152, and to extract additional advertising revenue on the basis of the sub-population that also views a second advertising segment 154.

In certain such embodiments, the system controller 90 is responsive to the metadata corresponding to an audiovisual advertising segment 32 and to the user input 70 from a corresponding user to record the response of the corresponding user to the corresponding advertising segment. For example, the system controller 90 can determine whether the user has watched only the first advertising segment 152, or has watched both the first advertising segment 152 and the second advertising segment 154.

In certain embodiments, the system controller 90 is adapted to provide the recorded response to a revenue calculating module. In certain such embodiments, the revenue calculating module is at a centralized location, such as the audiovisual data service provider, and the recorded responses are uploaded by the system controller 90. The recorded responses can then provide a basis for determining how many users actually viewed the advertising segments 32 for the purpose of calculating the revenue to be paid by the advertiser.

The system controller 90 of certain embodiments is further adapted to provide demographic information regarding the corresponding user to the revenue calculating module. In such embodiments, the amount of revenue to be paid by the advertiser can be calculated based in part on the number of users which viewed the corresponding advertising segment 32 that are in a demographic group identified as being of particular interest to the advertiser. For example, an advertiser of a luxury car may be willing to pay a premium based on the number of users in an identified demographic group (e.g., males 35 to 60 years old) which viewed the advertising segment 32.

In certain embodiments, the primary message of the first advertising segment 152 is self-contained (i.e., the primary message comprises a complete message independent from the secondary message). In alternative embodiments, the primary message and secondary message are related. For example, the secondary message can be a continuation of the primary message, or alternatively, the secondary message can be self-contained but can build upon the primary message by providing further information.

In certain embodiments, the primary message of the first advertising segment 152 is designed to front-load the resultant advertisement 30 with a high impact message or impression. One example of such an embodiment is a primary message comprising a beginning portion and a punch-line portion. The beginning portion of such an embodiment can be designed to attract the attention of the user while the punch-line portion can be designed to relate a desired advertising message. For example, the beginning portion can comprise waving a flag or a simple logo corresponding to the advertised goods, and the punch-line portion can comprise a one-sentence message which expresses the information which the advertiser desires to provide to the user.

In certain embodiments, the secondary message of the second advertising segment 154 is designed to induce or increase the likelihood that the user chooses to continue viewing the secondary message. The secondary message of certain such embodiments can comprise valuable content regarding a product, service, method, or technique likely to be useful to a person within the demographic group identified in the user profile 80. The secondary message of other embodiments can comprise an inducement to the user to continue viewing the secondary message. For example, the inducement can comprise a reward to the user for continuing to view the secondary message, where the reward comprises points to be redeemed for valuable prizes or eligibility in a lottery. Furthermore, the inducement of other embodiments can comprise information or clues useful towards the user solving a puzzle or mystery, or information useful towards the user participating in a game, lottery, or interactive program. In certain such embodiments, the user may be required to view more than one advertisement 30 to continue participating.

In embodiments in which the advertisement 30 is viewed by the user in conjunction with viewing an audiovisual program, the inducement can comprise information useful towards the user enjoying the audiovisual program, or information useful towards the user understanding the audiovisual program. For example, viewing the full advertisement 30 can be required to avoid having the content of the audiovisual program changed in a manner making the program less valuable to the user. In still other embodiments, the subject matter of the advertisement 30 can be correlated to the subject matter of the audiovisual program, thereby increasing the probability that the user will view the entire advertisement 30. In such embodiments, the system controller 90 is responsive to the subject matter of the program to retrieve the plurality of stored audiovisual advertising segments 32.

Figure 6:
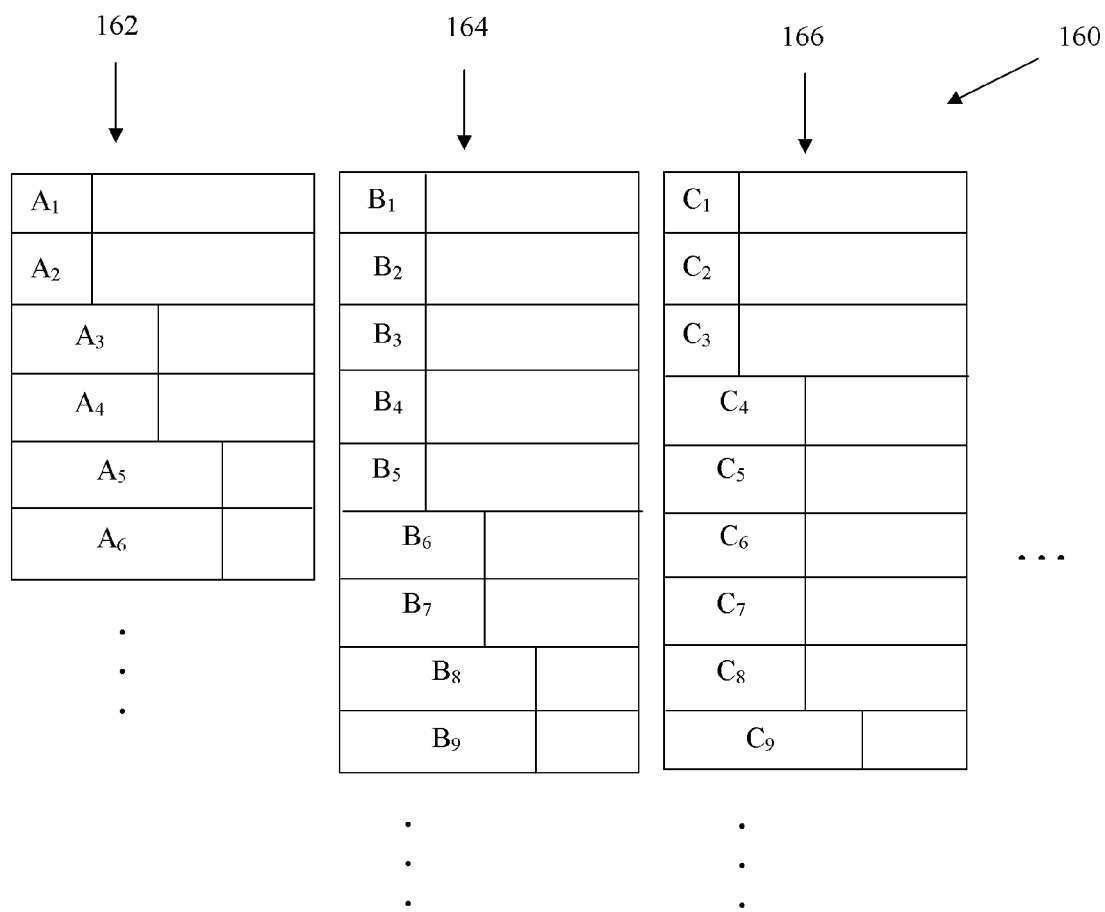
FIG. 6 schematically illustrates an audiovisual advertising segment database for forming multi-segment advertisements.

FIG. 6 schematically illustrates an audiovisual advertising segment database 160 for forming multi-segment advertisements 30 compatible with certain embodiments of the present invention. The size of the box denoting a particular advertising segment 32 in FIG. 6 is indicative of the length of the advertising segment 32. For example, segments $A_1$, $A_2$, $B_1$-$B_5$, and $C_1$-$C_3$ are 10 seconds long, segments $A_3$, $A_4$, $B_6$, $B_7$, and $C_4$-$C_8$ are 15 seconds long, and segments $A_5$, $A_6$, $B_8$, $B_9$, and $C_9$ are 20 seconds long. Other lengths of advertising segments 32 are compatible with embodiments of the present invention.

In certain such embodiments, a plurality of advertising segments 32 are dynamically assembled to form a 30-second advertisement 30. The system controller 90 of certain such embodiments is responsive to the user profile 80 of the current user to select the advertising segments 32 so as to tailor the resultant 30-second advertisement 30 to the characteristic viewing preferences of the user. For example, when the 10-second $A_1$ segment is the first advertising segment 162, the second advertising segment 164 can be selected to be one of the 20-second segments $B_8$ or $B_9$ based on the user profile 80. Alternatively, one of the 10-second segments $B_1$-$B_4$ can be assembled with the 10-second $A_1$ segment, along with one of the 10-second segments $C_1$-$C_3$ as the third advertising segment 166. Besides conforming to the constrained total length of 30 seconds, the advertising segments 32 are selected in accordance with the user profile 80.

Certain other embodiments do not have the constraint of forming advertisements 30 of fixed lengths. In such embodiments, any permutation of a first advertising segment 162, second advertising segments 164, and perhaps a third advertising segment 166 can be assembled to form the advertisement 30. Other embodiments can be constrained to only form advertisements 30 with equal-length segments. Still other embodiments can form advertisements 30 using more than three advertising segments 32 per advertisement 30.

In an exemplary embodiment, an advertisement 30 for a new automobile can comprise three advertising segments 32. The first advertising segment 162 can be designed to catch the attention of particular demographic age groups. As an example, segments $A_1$ and $A_2$ can be directed to men and women between the ages 18 to 29, and may comprise a rapid action driving scene of the automobile. Segments $A_3$ and $A_4$ can be directed to men and women between the ages of 29 to 55, and may comprise a scene with a family packing the automobile for a trip. Segments $A_5$ and $A_6$ can be directed to men and women over the age of 55, and may comprise a scene with grandparents arriving at a destination in the automobile.

In such an embodiment, the second advertising segment 164 can be designed to provide information regarding particular selling points of the automobile, such as various features, functions, or benefits. As an example, segment $B_1$ can comprise information regarding an engine turbo feature which boosts gas economy, segment $B_2$ can comprise information regarding a side air bag feature which increases safety, segment $B_3$ can comprise information regarding a leather interior feature which increases comfort, and segment $B_4$ can comprise information regarding a GPS locator feature which increases convenience.

In such an embodiment, the third advertising segment 166 can be designed to provide an attractive closing to the advertisement 30. As an example, segment $C_1$ can comprise an endorsement from a celebrity and segment $C_2$ can comprise an appeal to patriotism. The resultant advertisement 30 can be tailored to the user profile 80 by judicious selection of the best permutation of the possible first, second, and third advertising segments to appeal to the particular user.

In this way, advertising revenue can be based on advertisements 30 which are tailored via the metadata 50 to target particular types of users, and can provide a heightened impact on these users. Such embodiments empower the advertisers to enhance the impact of the advertisements 30 displayed to the users, and can increase the advertising revenue paid to by the advertisers. Such embodiments provide advertisements which cope somewhat with the freedom to skip over advertisements, as provided to users by virtue of personal video recording systems. Such embodiments can also have utility in e-commerce applications.

In certain embodiments, the system controller 90 retrieves the plurality of stored audiovisual advertising segments 32 in response to the current time of day information. For example, advertising segments 32 corresponding to the utility of a kitchen device to make breakfast meals may be retrieved by the system controller 90 for display in the morning hours, when the resultant advertisement 30 can be expected to have more relevance to the user than if the advertising segment were displayed in the evening.

In certain embodiments, the system controller 90 retrieves the plurality of stored audiovisual advertising segments 32 in response to a record of audiovisual advertisements 30 which have previously been viewed by the user. In this way, the system controller 90 can avoid repetition of identical audiovisual advertisements 30 or can otherwise control the number of times which a particular advertisement 30 is displayed to the user.

In certain embodiments, the system controller 90 retrieves the plurality of stored audiovisual advertising segments 32 in response to a record of a first advertising segment 32 previously viewed by the user during a first advertising break interval. In such embodiments, the system controller 90 can select a second advertising segment 32 to be displayed to the user during a second advertising break interval. In this way, a complete advertisement 30 can be displayed across multiple advertising break intervals.

Similarly, in other embodiments in which the first advertising break interval is on a first channel, the system controller 90 can select the second advertising segment 32 to be displayed to the user during an advertising break interval on a second channel. In this way, the complete advertisement 30 can be displayed across advertising break intervals on different channels. If the user changes to a premium channel (i.e., a channel without advertising breaks), the audiovisual system 10 can delay displaying the rest of the advertisement until the user is again viewing a channel with advertising break intervals. In certain such embodiments, the audiovisual system 10 can ensure that a particular advertisement 30 is displayed to the user despite changes of the channel by the user.

Figure 7:
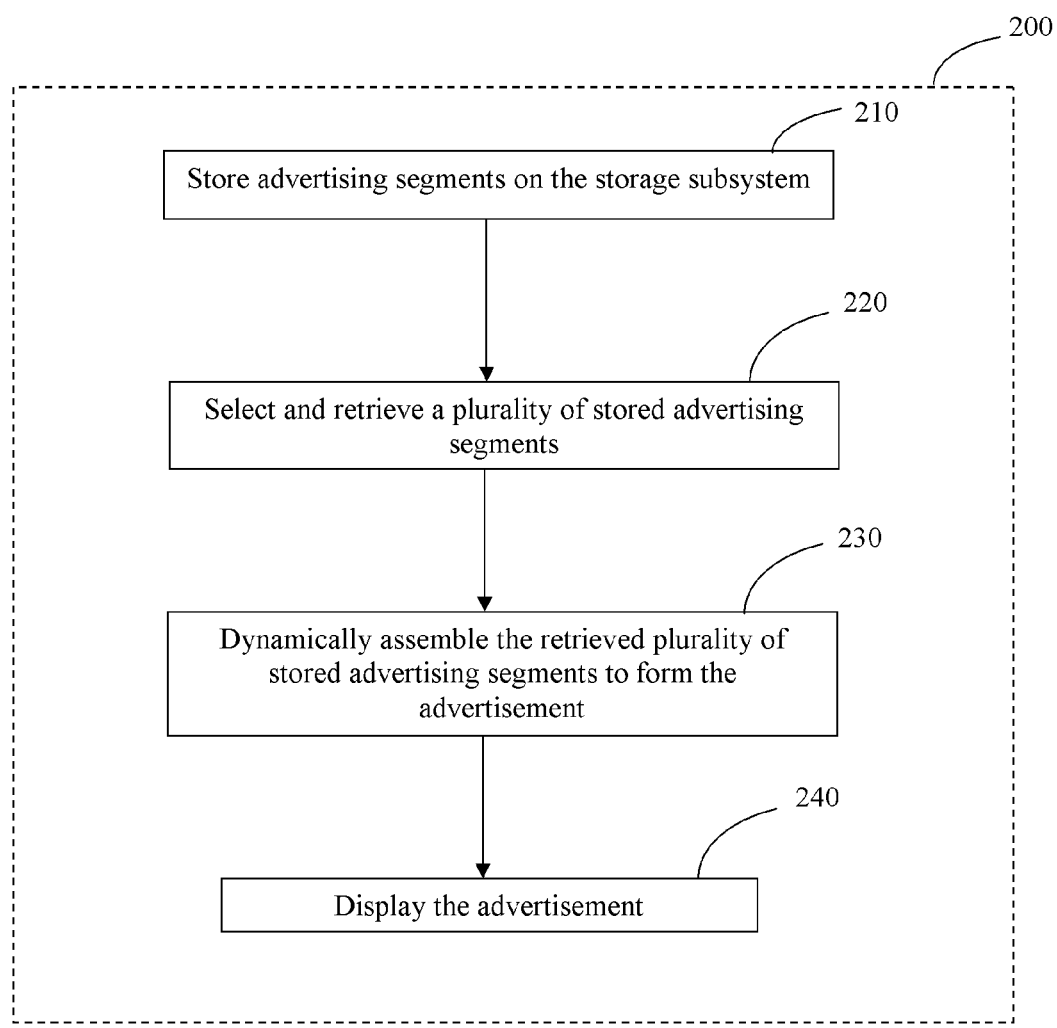
FIG. 7 schematically illustrates a method of displaying an audiovisual advertisement to a user.

FIG. 7 schematically illustrates a method 200 of displaying an audiovisual advertisement 30 to a user in accordance with an embodiment of the present invention. The user has characteristic viewing preferences and views a display device 20 coupled to an audiovisual system 10 comprising a storage subsystem 40. The method 200 comprises an operational block 210 for storing audiovisual advertising segments 32 on the storage subsystem 40. Each audiovisual advertising segment 32 has metadata 50 which is indicative of the audiovisual advertising segment 32. The method 200 further comprises an operational block 220 for selecting and retrieving a plurality of stored audiovisual advertising segments 32 from the storage subsystem 40. The stored audiovisual advertising segments 32 are selected and retrieved in response to the metadata 50 and to the characteristic viewing preferences of the user. The method 200 further comprises an operational block 230 for dynamically assembling the retrieved plurality of stored audiovisual advertising segments 32 to form the audiovisual advertisement 30. The audiovisual advertisement 30 is formed in response to the metadata 50 and to the characteristic viewing preferences of the user. The plurality of stored audiovisual advertising segments 32 is selected to tailor the audiovisual advertisement 30 to the characteristic viewing preferences of the user. The method 200 further comprises an operational block 240 for displaying the audiovisual advertisement 30 on the display device 40.

In certain embodiments, in the operational block 210, the audiovisual advertising segments 32 are stored on the storage subsystem 40 after being received as part of the streaming audiovisual data from the audiovisual data service provider. In certain such embodiments, the audiovisual advertising segments 32 are received in conjunction with audiovisual programs, while in other embodiments, the advertising segments 32 are received and stored separately from the audiovisual programs.

In certain embodiments, the metadata 50 indicative of the advertising segments 32 is also received in conjunction with the advertising segments 32 as part of the same streaming audiovisual data, while in other embodiments, the metadata 50 is received from other sources. These sources can include, but are not limited to, user input 70, EPG information 130, or data from a recognition algorithm of the system controller 90 in response to the audiovisual advertisement segment 32 itself, as described above. In certain embodiments, the metadata 50 also includes information indicative of the audiovisual programs being received. The received metadata 50 of certain embodiments is stored on the storage subsystem 40 in conjunction with storing of the corresponding advertising segments 32 and corresponding audiovisual programs.

Figure 8:
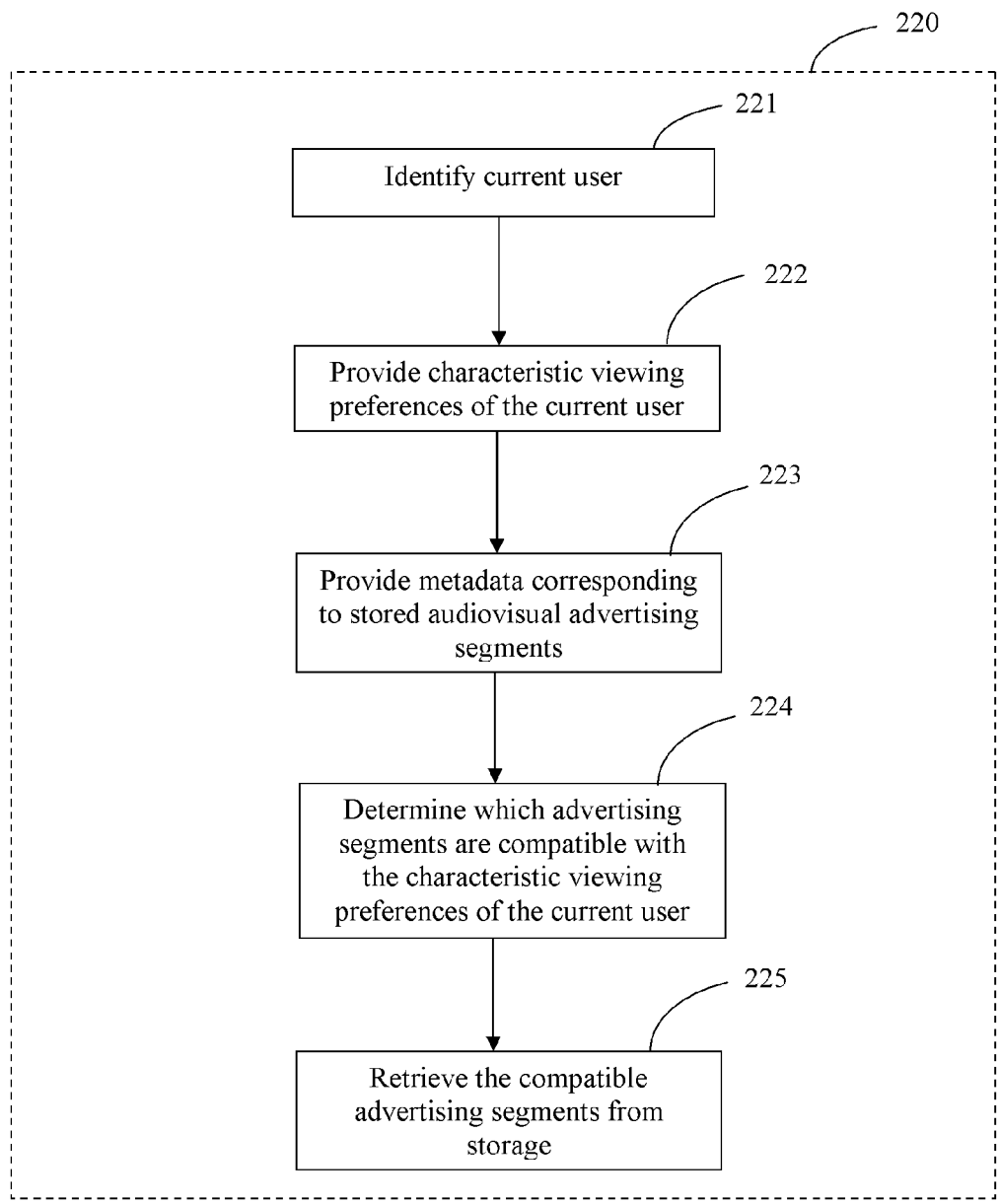
FIG. 8 is a flowchart corresponding to selecting and retrieving a plurality of stored audiovisual advertising segments.

FIG. 8 is a flowchart of the operational block 220 for selecting and retrieving a plurality of stored audiovisual advertising segments 32 in accordance with embodiments of the present invention. In the operational block 221, the current user of the audiovisual system 10 is identified. In certain such embodiments, the current user is identified from the user input 70 supplied by the user. As is described more fully below, if the current user is not identified, in certain embodiments, the audiovisual system 10 displays an advertisement 30 comprising default advertising segments 32.

In the operational block 222, the characteristic viewing preferences of the current user are provided. As described above, in certain embodiments, the characteristic viewing preferences of users are provided in the form of user profiles 80 generated and stored by the audiovisual system 10. In such embodiments, providing the characteristic viewing preferences comprises retrieving the user profile 80 of the current user from storage.

In the operational block 223, the metadata 50 corresponding to the stored audiovisual advertising segments 32 is provided. In embodiments in which the metadata 50 is stored on the storage subsystem 40 in conjunction with the storage of the corresponding advertising segments 32, providing the metadata 50 comprises retrieving the metadata 50 from storage. In certain embodiments in which the metadata 50 is generated "on-the-fly" from the advertising segment 32 itself, the stored advertising segment 32 is retrieved from storage and analyzed by a recognition module to generate the metadata 50.

In the operational block 224, the compatibility between the stored advertising segments 32 and the characteristic viewing preferences of the current user is determined. In certain embodiments, determining the compatibility comprises comparing the metadata 50 for each stored advertising segment 32 to the user profile 80 of the current user. For example, if the user profile 80 identifies the current user as having a viewing preference regarding safety ratings of automobiles, an advertising segment 32 corresponding to the high safety ratings of the advertised model of automobile would have a high compatibility with the current user. Similarly, the compatibility between a particular advertising segment 32 and the current user's characteristic viewing preferences can be based on demographic information or an interest parameter of the current user, as described above.

In other embodiments, determining which advertising segments 32 are compatible comprises determining which advertising segments 32 are eligible for display. In such embodiments, the metadata 50 can comprise at least one presentation directive corresponding to the advertising segment 32, and the presentation directive can be responded to by restricting which advertising segments 32 are considered eligible for use in the resultant advertisement 30.

For example, the metadata 50 for an advertising segment 32 corresponding to a particular brand of automobile may include a presentation directive that the advertising segment 32 is not to be used immediately following an advertisement 30 for another brand of automobile. Similarly, an advertising segment 32 corresponding to an airline may include a presentation directive that the advertising segment 32 is not to be used during a news program describing a plane crash. In other embodiments, the presentation directive is part of the metadata 50 corresponding to the audiovisual program. For example, the news program describing a plane crash may have metadata 50 directing the audiovisual system 10 that advertising segments 32 for airlines are ineligible for commercial breaks within the news program.

In still other embodiments, the presentation directive can provide guidelines or criteria regarding the order in which the advertising segments 32 can be assembled to form the audiovisual advertisement 30. For example, advertising segment 32 "B" may contain information which is best understood by the user only after receiving the information contained in advertising segment 32 "A". In such an embodiment, the metadata 50 can comprise a presentation directive which the audiovisual system 10 responds to by constraining the order in which these two advertising segments 32 are presented to the user so that advertising segment 32 "A" is displayed prior to advertising segment 32 "B".

In the operational block 225 of the embodiment illustrated in FIG. 8, the advertising segments 32 determined to be compatible with the characteristic viewing preferences of the current user are retrieved from storage. In certain embodiments, all of the compatible advertising segments 32 are retrieved from storage prior to determining which advertising segments 32 are eligible and are to be scheduled for display. In certain other embodiments, only the compatible advertising segments 32 which are scheduled for display are retrieved from storage.

In still other embodiments, the compatible advertising segments 32 can include default advertising segments 32 which are considered to be compatible with all viewing preferences. These default advertising segments 32 can be used in various embodiments. Such embodiments include, but are not limited to, embodiments in which there are no other advertising segments 32 which are compatible with the user profile 80 of the current user, in which there are multiple current users with conflicting viewing preferences, or in which the current user is not identified. These default advertising segments 32 can be individually assembled with other compatible advertising segments 32 to form advertisements 30, or the default advertising segments 32 can be used to form default advertisements 30.

Figure 9:
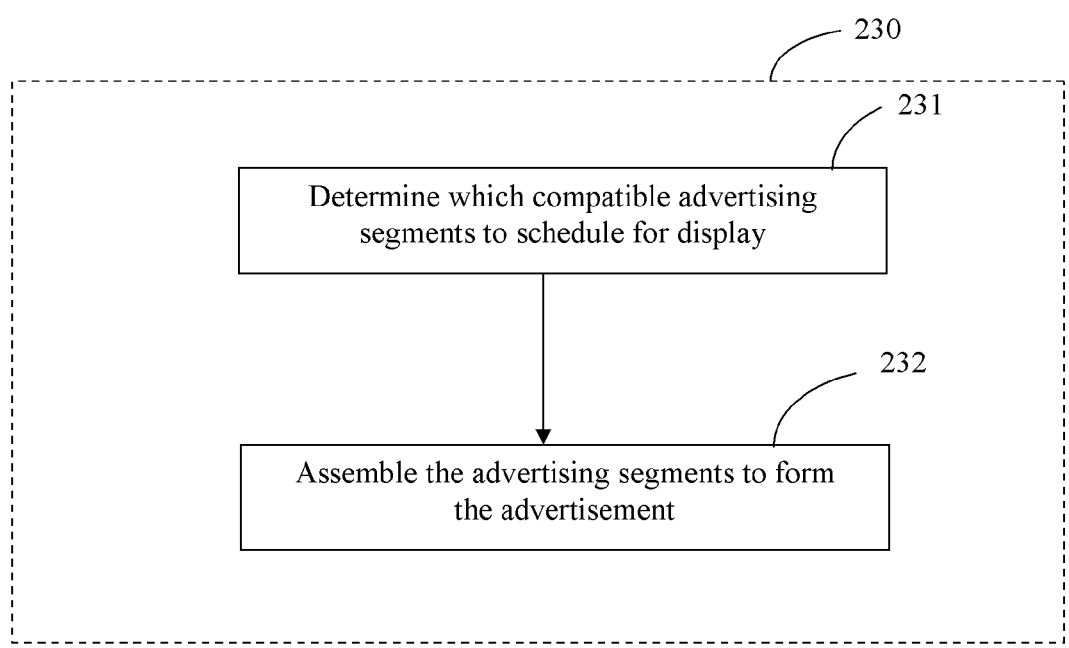
FIG. 9 is a flowchart corresponding to dynamically assembling the retrieved plurality of stored advertising segments to form the advertisement.

FIG. 9 is a flowchart of the operational block 230 for dynamically assembling the retrieved plurality of stored advertising segments 32 to form the advertisement 30 in accordance with embodiments of the present invention. As used herein, the term "dynamically assemble" refers to assembling the advertising segments 32 "on-the-fly" (i.e., prior to or concurrently with the display of the advertisement 30). In this way, the advertisement 30 is formed by advertising segments 32 selected based on an up-to-date version of the characteristic viewing preferences of the current user.

The operational block 231 comprises determining which advertising segments 32 to schedule for display. In certain embodiments in which there are more compatible advertising segments 32 than are needed for a particular commercial break, the audiovisual system 10 can utilize additional criteria to select which advertising segments 32 to schedule for display. These additional criteria can include, but are not limited to, hierarchies among advertisement subject matter or hierarchies among particular advertisers. These additional criteria can be expressed to the audiovisual system 10 in the form of metadata 50, user input 70, or other forms.

In certain embodiments, determining which advertising segments 32 to schedule for display is done in response to the metadata 50 and to the user profile 80. For example, the user profile 80 of certain such embodiments includes a record of recent advertisements 30 previously displayed to the current user, and the advertising segments 32 scheduled for display are chosen to avoid duplication or to continue a series of advertisements 30. Similarly, advertising segments 32 contributing to the enjoyment or understanding of the audiovisual program can be scheduled for display during a commercial break of the program.

In the operational block 232 of the embodiment illustrated in FIG. 9, the scheduled advertising segments 32 are dynamically assembled to form the advertisement 30. In certain embodiments, the metadata 50 for each advertising segment 32 is examined to determine the order in which the advertising segments 32 are to be assembled. By assembling the advertising segments 32 dynamically, the resultant advertisement 30 is formed based on an up-to-date version of the characteristic viewing preferences of the current user.

In the operational block 240 of the embodiment illustrated in FIG. 7, the resultant advertisement 30 is displayed. In certain embodiments, the system controller 90 transmits the assembled advertising segments 32 to the display device 40.

Figure 10:
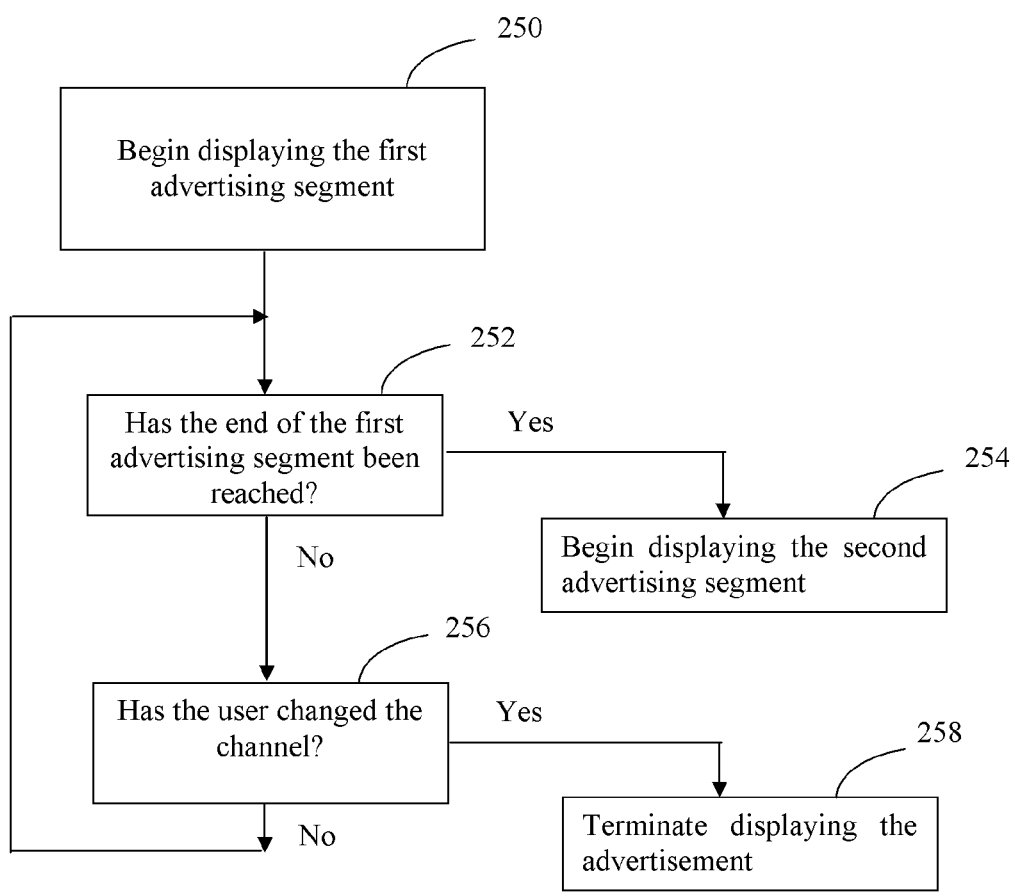
FIG. 10 is a flowchart corresponding to an embodiment compatible with monitoring channel change commands when displaying two-segment advertisements.

In certain embodiments, the audiovisual system 10 monitors whether the user is viewing the advertisement 30 by determining if the user has sent a channel change command to the audiovisual system 10 via the user input 70. FIG. 10 is a flowchart of one such embodiment compatible with two-segment advertisements 30. In an operational block 250, the audiovisual system 10 begins to display the first advertising segment 152. In an operational block 252, the audiovisual system 10 determines whether the end of the first advertising segment 152 has been reached. If so, the audiovisual system 10 begins displaying the second advertising segment 154, as illustrated in the operational block 254. If the end of the first advertising segment 152 has not yet been reached, the audiovisual system 10 determines whether the user has changed the channel, as illustrated in the operational block 256. If so, the audiovisual system 10 terminates displaying of the advertisement 30, as illustrated in the operational block 258. If not, the audiovisual system 10 continues displaying the advertisement 30. In other embodiments, a similar procedure can be used to monitor the user's viewing of the second advertising segment 154.

Figure 11:
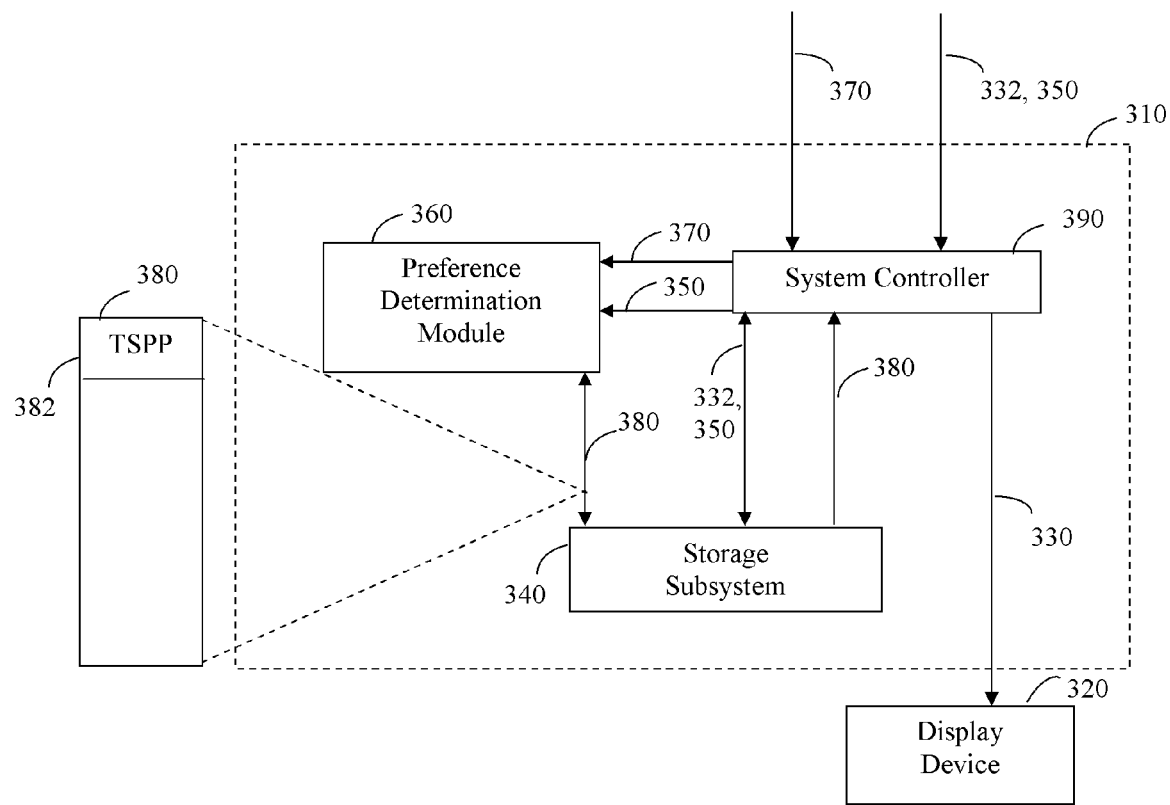
FIG. 11 schematically illustrates an audiovisual system utilizing a time span preference parameter.

FIG. 11 schematically illustrates another embodiment of an audiovisual system 310 for use with a display device 320 for displaying an audiovisual advertisement 330 to a user. The audiovisual system 310 comprises a storage subsystem 340 adapted to receive and store audiovisual advertising segments 332 and to retrieve and transmit stored audiovisual advertising segments 332. Each audiovisual advertising segment 332 has metadata 350 indicative of the audiovisual advertising segment 332.

The audiovisual system 310 further comprises a preference determination module 360 coupled to the storage subsystem 340. The preference determination module 360 is responsive to the user input 370 and to the metadata 350 to generate one or more user profiles 380. Each user profile 380 is indicative of characteristic viewing preferences of a corresponding user and is stored on the storage subsystem 340. Each user profile 380 comprises a time span preference parameter 382 indicative of a preferred advertisement time span of the corresponding user.

The audiovisual system 310 further comprises a system controller 390 coupled to the storage subsystem 340. The system controller 390 is responsive to the metadata 350 and to the user profile 380 corresponding to the user to select and retrieve at least one stored audiovisual advertising segment 32 from the storage subsystem 340. The audiovisual advertisement 330 has a time span which conforms to the time span preference parameter 382 of the user profile 380.

In certain embodiments, the preferred advertisement time span of a user reflects whether the user prefers standard-length advertisements 30 or shortened-length advertisements 30. In certain such embodiments, inclusion of the corresponding time span preference parameter 382 in the user profile 380 is a fee-based option. As such, upon payment of the fee, the retrieved stored audiovisual advertisement 330 is selected based in part on the time span preference parameter 382.

For example, a user may be willing to pay the fee to have shortened-length advertisements 30 displayed. Once the user pays the fee, a corresponding time span preference parameter 382 is included in the user profile 380 of the user. In certain embodiments, the audiovisual system 310 responds to the time span preference parameter 382 by selecting advertising segments 332 of shortened time spans (e.g., 5 or 10 seconds). In certain other embodiments, the audiovisual system 310 responds by only displaying one or two advertising segments 332. In this way, the audiovisual advertisement 330 has a time span which conforms to the time span preference parameter 382 of the user profile 380.

What is claimed is:

1. An audiovisual system for use with a display device for displaying an audiovisual advertisement to a user, the audiovisual system comprising:
   a storage subsystem adapted to receive and store audiovisual advertising segments and to retrieve and transmit stored audiovisual advertising segments, each audiovisual advertising segment having metadata indicative of the audiovisual advertising segment;
   a preference determination module coupled to the storage subsystem, the preference determination module responsive to user input and to the metadata to generate one or more user profiles, each user profile comprising a time span preference parameter indicative of a preferred advertisement time span of the corresponding user; and
   a system controller coupled to the storage subsystem, the system controller responsive to the metadata and to the user profile corresponding to the user to select and retrieve a plurality of stored audiovisual advertising segments from the storage subsystem and to dynamically assemble the retrieved plurality of stored audiovisual advertising segments to form the audiovisual advertisement, whereby the plurality of stored audiovisual advertising segments is selected to tailor the audiovisual advertisement to have a time span which conforms to the time span preference parameter of the user profile.

2. The audiovisual system of claim 1, wherein the metadata is indicative of a length of the audiovisual advertising segment.

3. The audiovisual system of claim 1, wherein the metadata is indicative of subject matter of the audiovisual advertising segment.

4. The audiovisual system of claim 1, wherein the metadata comprises at least one presentation directive corresponding to the audiovisual advertising segment.

5. The audiovisual system of claim 4, wherein the presentation directive comprises at least one guideline regarding a sequence order of the dynamically assembled plurality of stored audiovisual advertising segments.

6. The audiovisual system of claim 1, wherein the user profile comprises demographic information regarding the user.

7. The audiovisual system of claim 1, wherein the user profile comprises information regarding subject matter preferences of the user.

8. The audiovisual system of claim 1, wherein the user profile comprises information regarding genre preferences of the user.

9. The audiovisual system of claim 1, wherein the user profile comprises information regarding performer preferences of the user.

10. The audiovisual system of claim 1, wherein the user input comprises a plurality of viewing decisions by the user and the time span preference parameter is generated by the preference determination module, the preference determination module utilizing a statistical analysis of the plurality of viewing decisions to generate the time span preference parameter.

11. The audiovisual system of claim 10, wherein the preference determination module is further responsive to electronic program guide information to generate the time span preference parameter.

12. The audiovisual system of claim 10, wherein the preference determination module is further responsive to current time of day information to generate the time span preference parameter.

13. The audiovisual system of claim 10, wherein the preference determination module is further responsive to current date information to generate the time span preference parameter.

14. The audiovisual system of claim 1, wherein the at least one stored audiovisual advertising segment comprises a first stored audiovisual advertising segment and a second stored audiovisual advertising segment, the first audiovisual advertising segment comprising a primary message to be displayed to the user during the preferred advertisement time span, the second audiovisual advertising segment comprising a secondary message to be displayed to the user when the user continues viewing after the preferred advertisement time span.

15. The audiovisual system of claim 14, wherein the primary message is self-contained.

16. The audiovisual system of claim 15, wherein the primary message and the secondary message are related.

17. The audiovisual system of claim 16, wherein the secondary message is a continuation of the primary message.

18. The audiovisual system of claim 16, wherein the secondary message is self-contained.

19. The audiovisual system of claim 14, wherein the primary message comprises a beginning portion and a punchline portion.

20. The audiovisual system of claim 14, wherein the secondary message comprises an inducement to the user to continue viewing the secondary message.

21. The audiovisual system of claim 20, wherein the inducement comprises a reward to the user for continuing to view the secondary message.

22. The audiovisual system of claim 21, wherein the reward comprises points to be redeemed.

23. The audiovisual system of claim 21, wherein the reward comprises eligibility in a lottery.

24. The audiovisual system of claim 20, wherein the inducement comprises information useful towards the user solving a puzzle or mystery.

25. The audiovisual system of claim 20, wherein the audiovisual advertisement is viewed by the user in conjunction with viewing an audiovisual program and the inducement comprises information useful towards the user enjoying the audiovisual program.

26. The audiovisual system of claim 20, wherein the audiovisual advertisement is viewed by the user in conjunction with viewing an audiovisual program and the inducement comprises information useful towards the user understanding the audiovisual program.

27. The audiovisual system of claim 20, wherein the inducement comprises information useful towards the user participating in an interactive program.

28. The audiovisual system of claim 1, wherein the system controller is further responsive to the metadata corresponding to the audiovisual advertising segment and to the user input from a corresponding user to record a response of the corresponding user to the corresponding audiovisual advertising segment.

29. The audiovisual system of claim 28, wherein the system controller is adapted to provide the recorded response to a revenue calculating module.

30. The audiovisual system of claim 29, wherein the system controller is further adapted to provide demographic information regarding the corresponding user to the revenue calculating module.

31. The audiovisual system of claim 1, wherein the system controller is further responsive to current time of day information to retrieve the plurality of stored audiovisual advertising segments.

32. The audiovisual system of claim 1, wherein the audiovisual advertisement is displayed to the user during an advertising interval of a program, the system controller being further responsive to subject matter of the program to retrieve the plurality of stored audiovisual advertising segments.

33. The audiovisual system of claim 1, wherein the system controller is further responsive to a record of audiovisual advertisements previously viewed by the user, thereby avoiding repetition of identical audiovisual advertisements.

34. The audiovisual system of claim 1, wherein the system controller is further responsive to a record of a first advertising segment previously viewed by the user during a first advertising break interval to select a second advertising segment to be displayed to the user during a second advertising break interval.

35. The audiovisual system of claim 1, wherein the system controller is further responsive to a record of a first advertising segment previously viewed by the user during an advertising break interval of a first channel to select a second advertising segment to be displayed to the user during an advertising break interval of a second channel.

36. The audiovisual system of claim 1, wherein the retrieved plurality of stored audiovisual advertising segments comprises at least two stored audiovisual advertising segments with substantially equal time spans.

37. The audiovisual system of claim 1, wherein the time span preference parameter is a fee-based option.

38. A method of displaying an audiovisual advertisement to a user viewing a display device coupled to an audiovisual system comprising a storage subsystem, the user having characteristic viewing preferences, the method comprising:
storing audiovisual advertising segments on the storage subsystem, each audiovisual advertising segment having metadata indicative of the audiovisual advertising segment;
selecting and retrieving a plurality of stored audiovisual advertising segments from the storage subsystem in response to the metadata and to a time span preference parameter indicative of a preferred advertisement time span of the corresponding user;
dynamically assembling the retrieved plurality of stored audiovisual advertising segments to form the audiovisual advertisement, the audiovisual advertisement formed in response to the metadata and to the time span preference parameter, whereby the plurality of stored audiovisual advertising segments is selected to tailor the audiovisual advertisement to the preferred advertisement time span; and
displaying the audiovisual advertisement on the display device.

39. The method of claim 38, wherein the metadata is received in conjunction with the audiovisual advertising segments.

40. The method of claim 38, wherein storing the audiovisual advertising segments comprises storing the metadata on the storage subsystem.

41. The method of claim 38, wherein selecting and retrieving a plurality of stored audiovisual advertising segments comprises:
- identifying the user;
- providing the time span preference parameter of the user;
- providing the metadata corresponding to the stored audiovisual advertising segments;
- determining which stored audiovisual advertising segments are compatible with the preferred advertisement time span of the user; and
- retrieving compatible stored audiovisual advertising segments from the storage subsystem.

42. The method of claim 41, wherein providing the metadata comprises retrieving the metadata from the storage subsystem.

43. The method of claim 41, wherein providing the metadata comprises analyzing the stored audiovisual advertising segments using a recognition module.

44. The method of claim 41, wherein determining which stored audiovisual advertising segments are compatible comprises comparing the metadata for each stored audiovisual advertising segment to a user profile comprising the time span preference parameter.

45. The method of claim 41, wherein determining which stored audiovisual advertising segments are compatible comprises responding to at least one presentation directive of the metadata to determine which stored audiovisual advertising segments are eligible for display.

46. The method of claim 45, wherein retrieving compatible stored audiovisual advertising segments is performed prior to responding to the presentation directive to determine which stored audiovisual advertising segments are eligible for display.

47. The method of claim 41, wherein retrieving compatible stored audiovisual advertising segments comprises retrieving only compatible stored audiovisual advertising segments which are scheduled for display.

48. The method of claim 41, wherein retrieving compatible stored audiovisual advertising segments comprises retrieving default audiovisual advertising segments.

49. The method of claim 38, wherein dynamically assembling the retrieved plurality of stored audiovisual advertising segments comprises:
- determining which stored audiovisual advertising segments to schedule for display; and
- dynamically assembling the scheduled audiovisual advertising segments to form the advertisement.

* * * * *